INVENTOR.
Fred Perlin

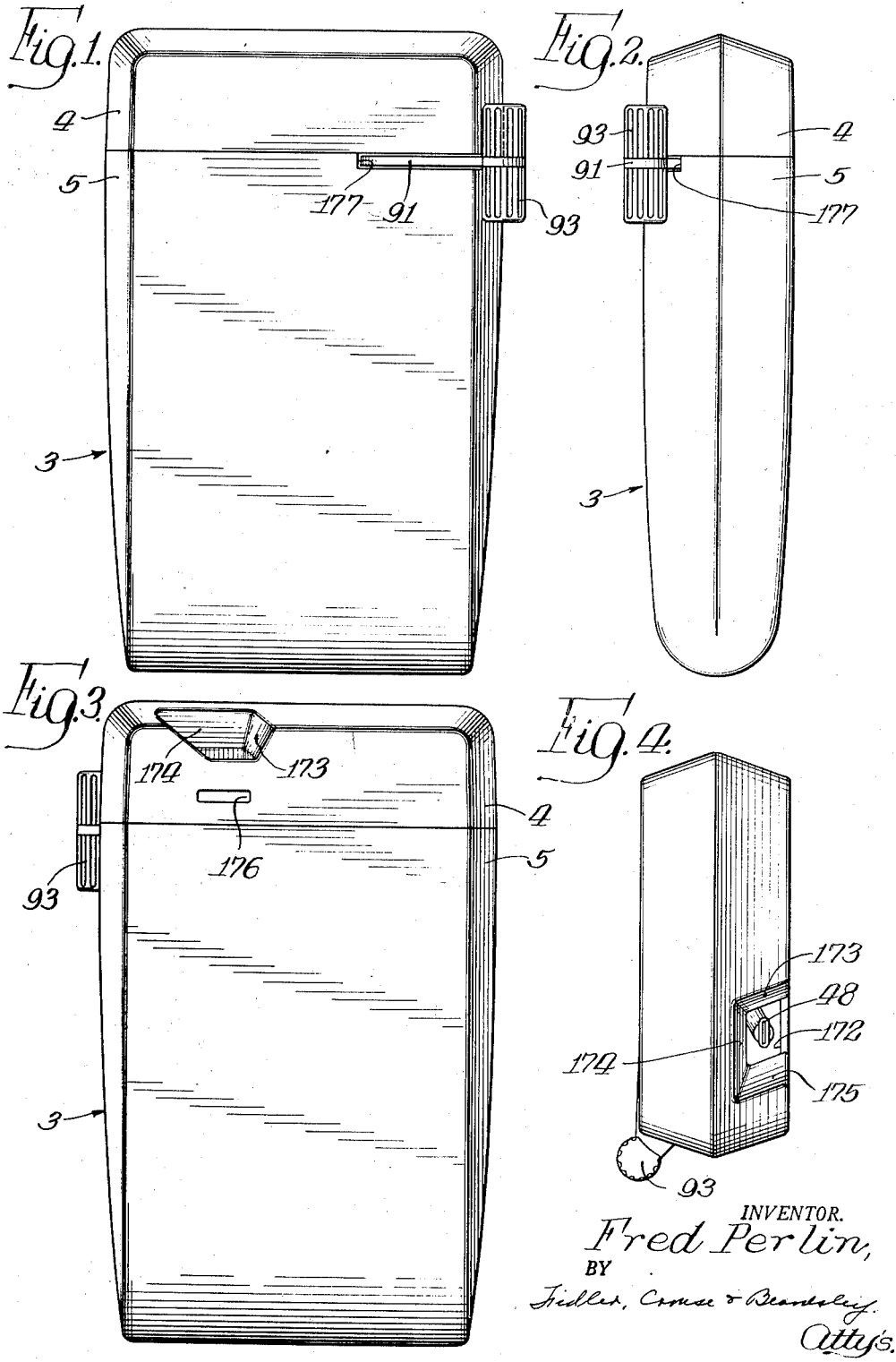

Feb. 5, 1957 — F. PERLIN — 2,780,085
LIGHTERS
Filed Jan. 27, 1953 — 10 Sheets-Sheet 3
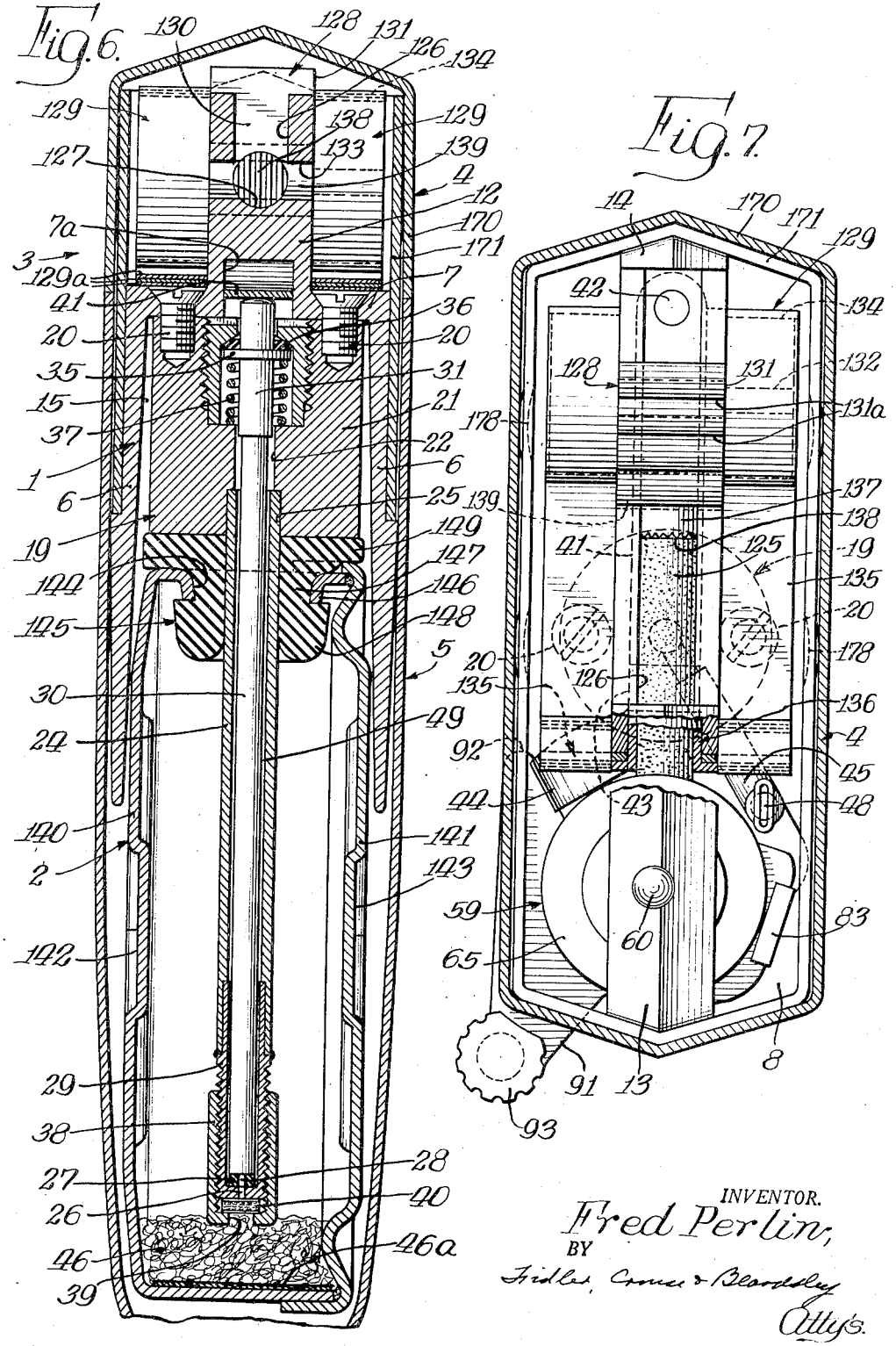
INVENTOR.
Fred Perlin,
BY
Fidler, Crouse & Beardsley
Attys.

Feb. 5, 1957 F. PERLIN 2,780,085
LIGHTERS
Filed Jan. 27, 1953 10 Sheets-Sheet 4

INVENTOR.
Fred Perlin;
BY
Fidler, Connie & Beardsley
Attys.

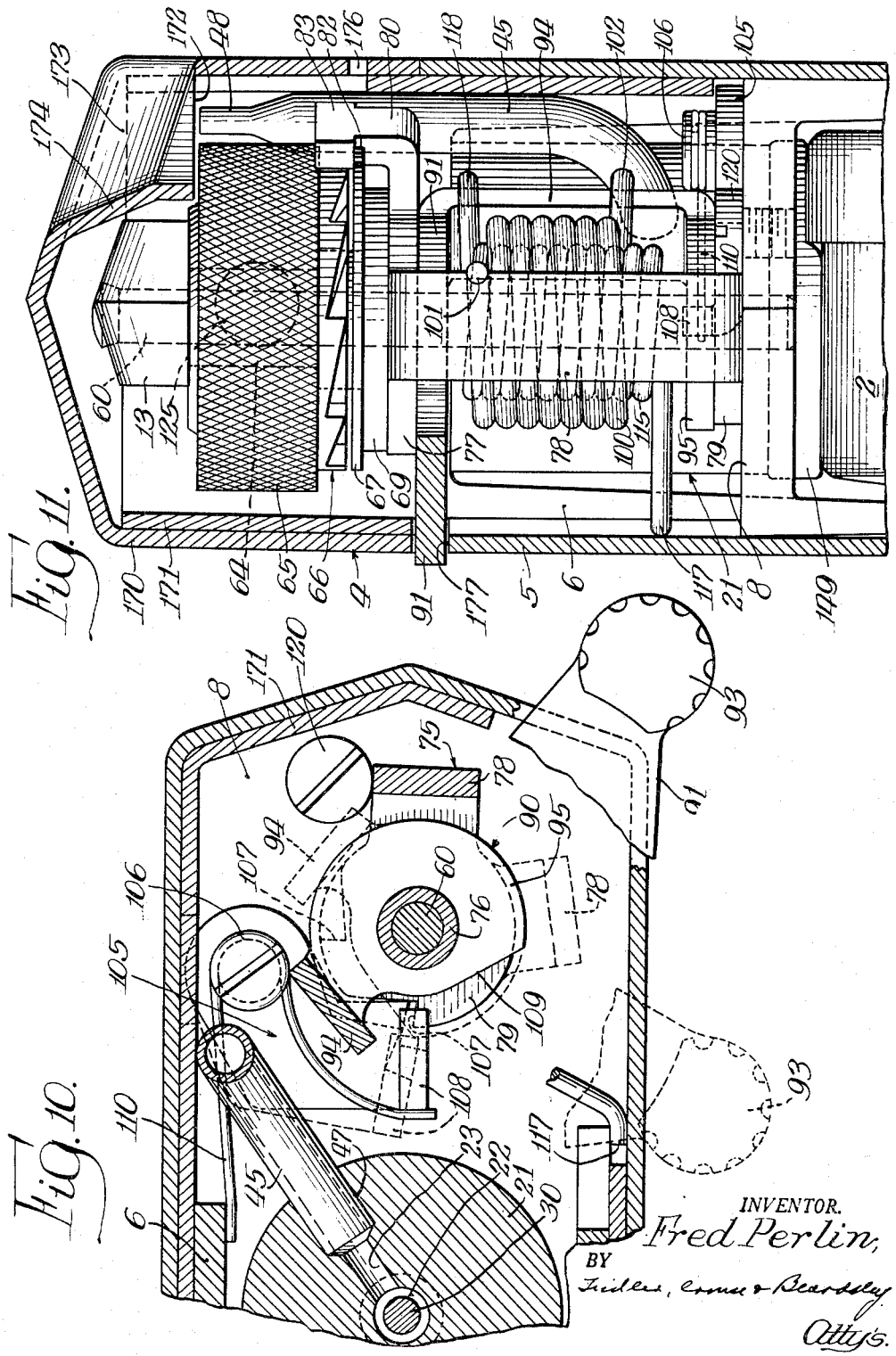

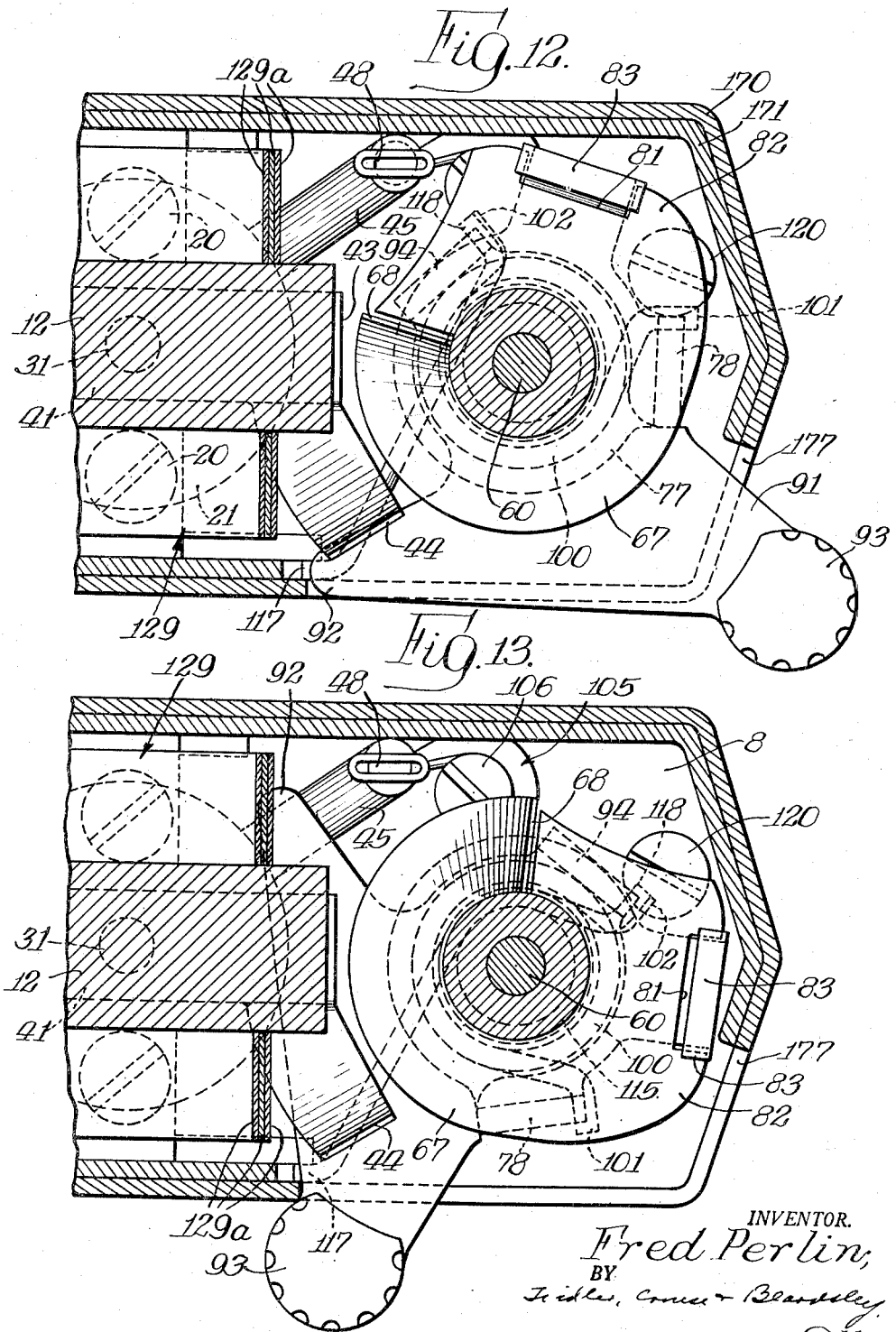

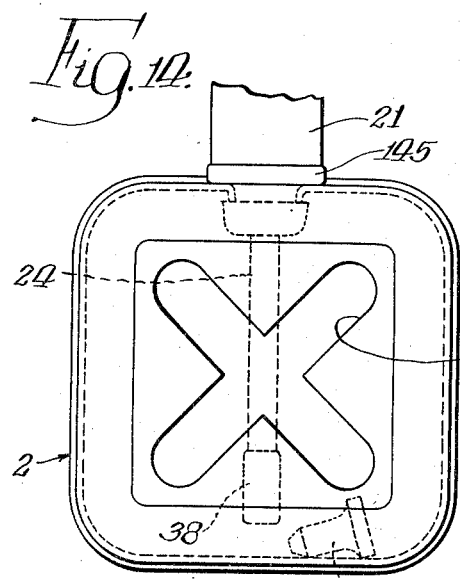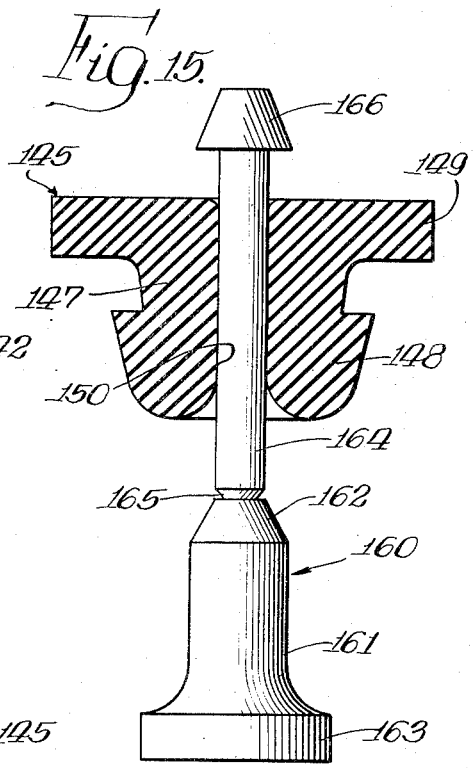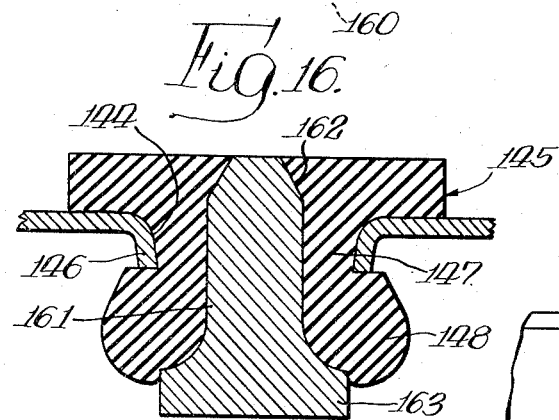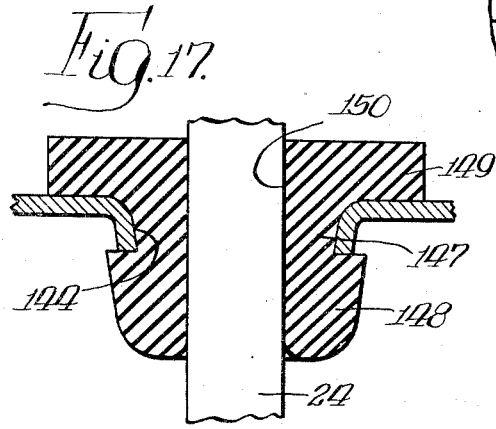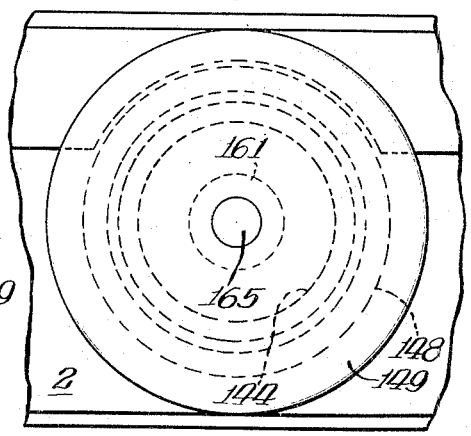

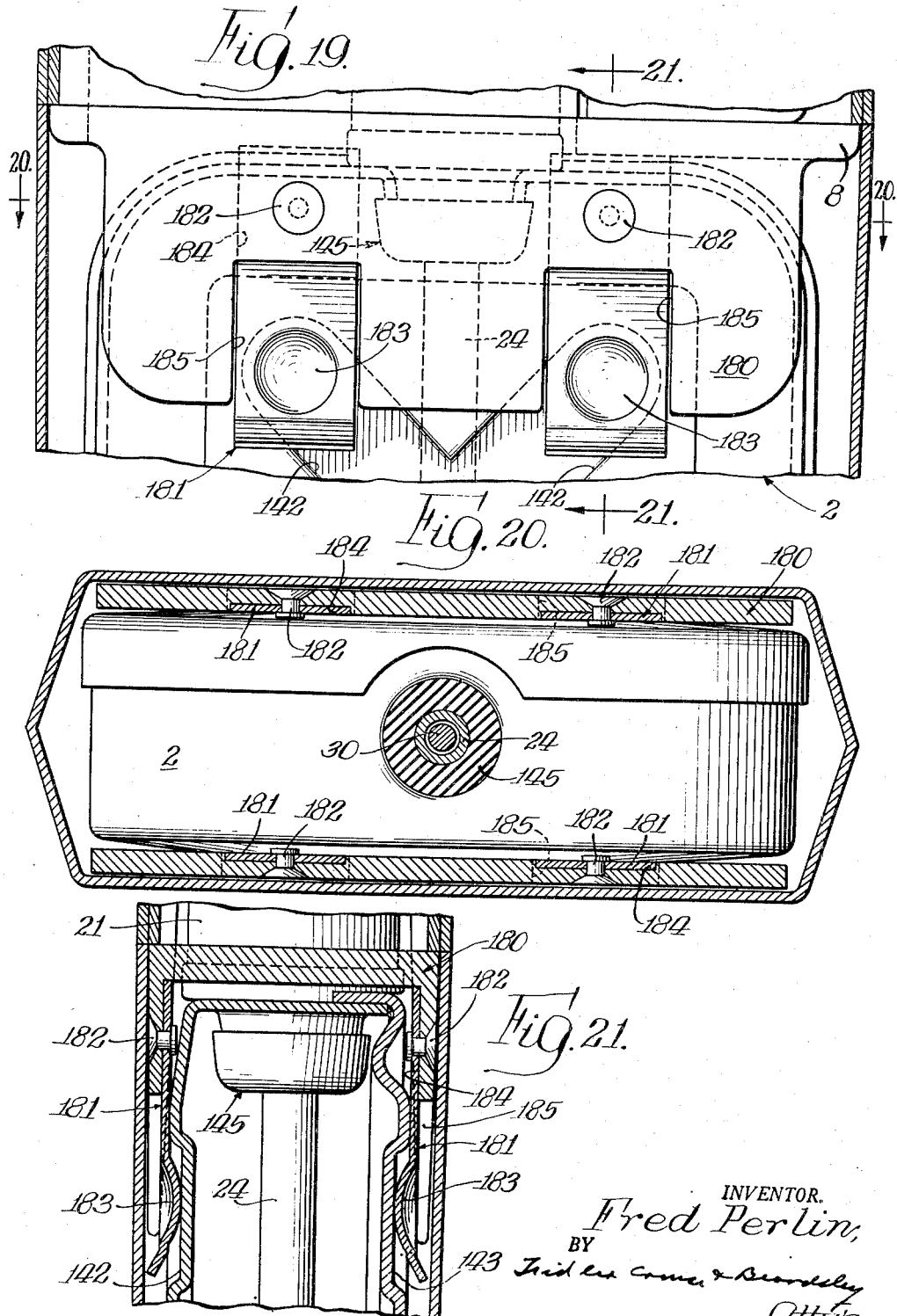

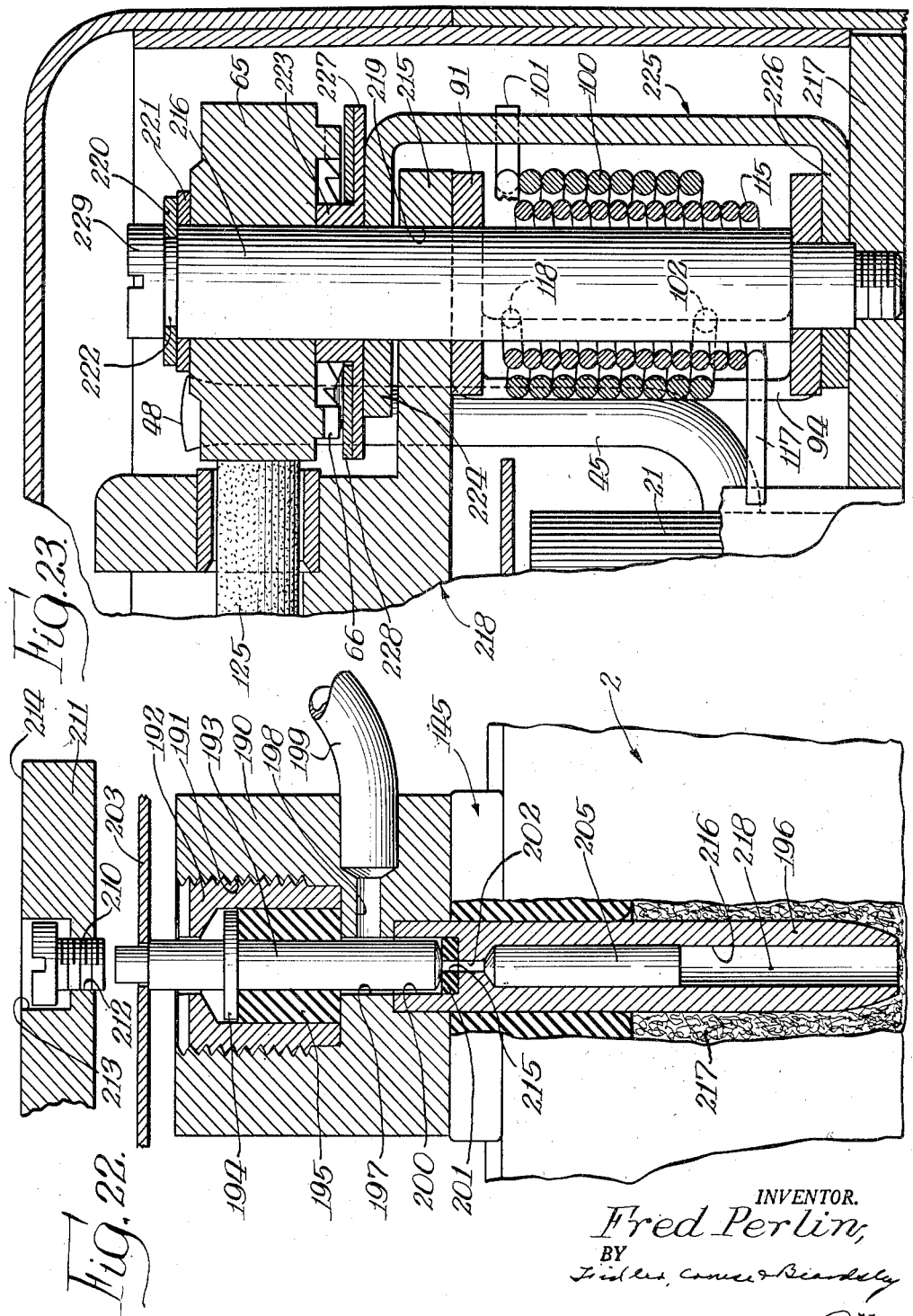

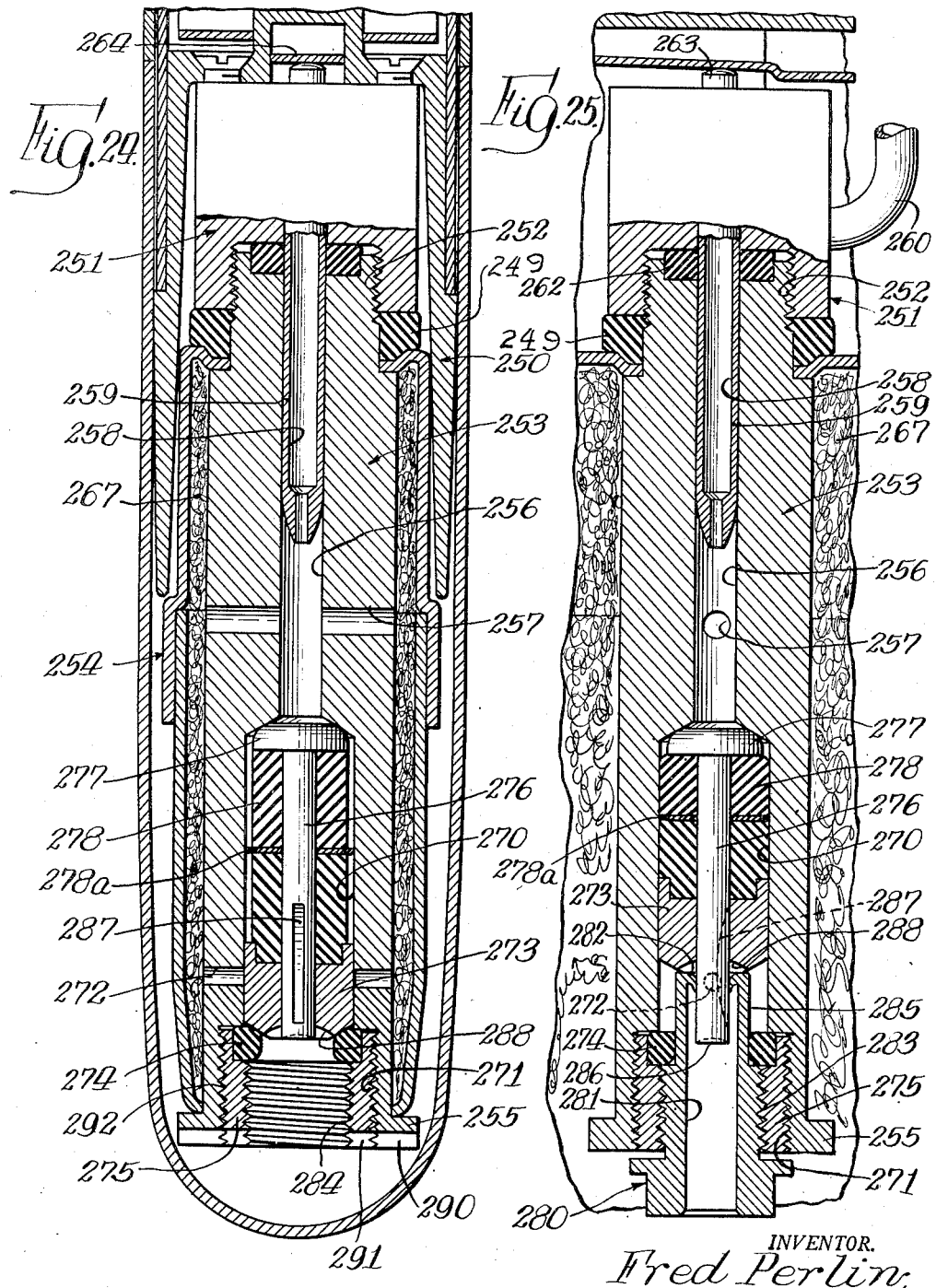

United States Patent Office 2,780,085
Patented Feb. 5, 1957

2,780,085

LIGHTERS

Fred Perlin, Edgerton, Wis., assignor to The Parker Pen Company, Janesville, Wis., a corporation of Wisconsin Application January 27, 1953, Serial No. 333,415

10 Claims. (Cl. 67—7.1)

This invention relates to lighters of the type commonly employed for lighting cigars and cigarettes, and has to do particularly with a lighter adapted to employ as a fuel a normally gaseous material which is stored in the lighter either as a compressed or liquefied gas and burned in gaseous form.

An object of the present invention is to provide an improved lighter of the gaseous fuel type having an operating mechanism whereby the flow of gaseous fuel from the lighter and the ignition thereof is under control of a single operating member adapted to be actuated by the user.

Another object is the provision of a lighter wherein upon manipulation by the user of an operating member through a predetermined extent of movement a sparking or flint wheel is rotated in contact with a flint at a predetermined velocity independently of the acceleration or pressure applied to the operating member by the user.

Another object is the provision in a lighter of a mechanism for applying a predetermined, constant feeding force upon the flint to maintain it in contact with the sparking or flint wheel under uniform pressure throughout the entire range of feeding movement.

Another object is the provision in a lighter of a valving mechanism for controlling the passage of fuel from a fuel reservoir or tank to an outlet or burner which insures that only fuel in gaseous form is delivered to the burner.

Another object is the provision of a lighter having an improved mechanism for adjusting and controlling the pressure of the fuel at the burner and consequently the height of the flame resulting when the fuel is ignited at the burner.

Another object is the provision of a lighter having an improved fuel tank or reservoir for a lighter which is simple and inexpensive to manufacture, which is strong and non-leaking and which may be readily assembled with and disassembled from the other members forming the lighter.

A further object is to provide a lighter having an improved casing or housing which can be readily and inexpensively manufactured, can be readily assembled in inclosing relation with substantially all of the operative members of the lighter and which can be readily removed for the purpose of replacing or adjusting certain of the members inclosed by the casing.

Another object is to provide a lighter having a friction or sparking wheel actuating mechanism which upon a simple manual manipulation of an actuating member positively effects a rapid rotation of the sparking or flint wheel past and in contact with the flint to positively strike a shower of sparks into the fuel issuing from the burner.

Another object is to provide a lighter which can be readily manufactured by quantity production methods, which can be readily assembled, which can be readily disassembled for replacement or repair of parts and which requires little if any adjustment, repair or replacement of parts (except consumable items such as fuel or flints) over a long period of use.

Still another object of the invention is the provision of a lighter having a fuel tank or reservoir provided with an improved closure arrangement which permits convenient filling of the tank with fuel and ready assembly of the tank with the remainder of the lighter and connection of the interior of the tank with the valve and burner mechanism of the lighter.

Still another object is the provision of a lighter having a fuel tank or reservoir provided with an improved filling valve mechanism which permits rapid and convenient filling of the tank with fuel without loss of fuel and which effectively closes and seals the tank at all times except during the filling operation.

Another object is to provide a lighter having an improved flint guiding and feeding arrangement whereby the flint is effectively held and guided into engagement with the flint wheel, and whereby the flint may be readily removed and replaced by the user.

Another object is to provide a lighter having an improved flint guiding and feeding arrangement which is adapted to receive and effectively guide flints varying in lengths.

Another object is to provide a lighter of the type employing a fuel of the liquefied gas type wherein height of the flame may be readily adjusted by the user.

Another object is to provide a lighter of the type employing a fuel of the liquefied gas type wherein the height of the flame is automatically maintained at substantially a uniform height over a considerable range of ambient temperatures.

A further object is to provide a lighter wherein the sparking or flint wheel may be readily removed and replaced by the user.

Another object is to provide a lighter of the gaseous fuel type having a fuel tank which may be readily recharged with fuel without removing the tank from the lighter.

A further object is to provide a lighter having a fuel tank which may be recharged with fuel whether in empty or partially empty condition and without any loss of fuel.

Other objects and advantages of the invention will appear from the following description taken in connection with the appending drawings, wherein:

Figure 1 is a side elevational view of a lighter constructed according to the present invention;

Fig. 2 is an end elevational view of the lighter of Fig. 1;

Fig. 3 is a side elevational view of the lighter of Fig. 1, taken from the opposite side;

Fig. 4 is a top plan view of the lighter of Fig. 1;

Fig. 6 is a vertical sectional view taken along the line 6—6 of Fig. 5;

Fig. 7 is a horizontal sectional view taken along the line 7—7 of Fig. 5;

Fig. 10 is a fragmentary, horizontal, sectional view taken along the line 10—10 of Fig. 8;

Fig. 11 is a fragmentary, vertical sectional view taken along the line 11—11 of Fig. 8;

Fig. 12 is a fragmentary horizontal view taken along the line 12—12 of Fig. 8;

Fig. 13 is a view similar to Fig. 12 only showing the parts in a different operational position;

Fig. 14 is a fragmentary view showing particularly the fuel tank and its connection to valve body;

Fig. 15 is an enlarged fragmentary view, partially in cross section showing the tank plug and core assembly in condition prior to the assembly in the tank;

Fig. 16 is an enlarged, fragmentary, vertical sectional view showing the tank plug and core in position in the tank with the core extension removed;

Fig. 17 is an enlarged view partially in cross section showing the tank plug with the outlet stem inserted therein;

Fig. 18 is an enlarged, fragmentary top plan view of a portion of the tank showing particularly the tank plug;

Fig. 19 is an enlarged, fragmentary view, partially in section showing a modified form of the invention wherein is embodied clips for aiding in securing the tank to the chassis;

Fig. 20 is a view showing a section along line 20—20 of Fig. 19;

Fig. 21 is a view showing a section along line 21—21 of Fig. 19;

Fig. 22 is an enlarged, fragmentary, vertical sectional view showing a modified form of outlet valve mechanism;

Fig. 23 is an enlarged, fragmentary, vertical sectional view showing a modified form of the means for mounting the sparking wheel;

Fig. 24 is an enlarged, fragmentary, vertical sectional view showing a further modification wherein the tank is fixed to the chassis and a filling valve is provided for filling the tank in situ; and Fig. 25 is a view generally similar to Fig. 24 but with the device turned at 90° and showing a portion of a filling stem, and with the filling valve in open condition.

Figure 5:
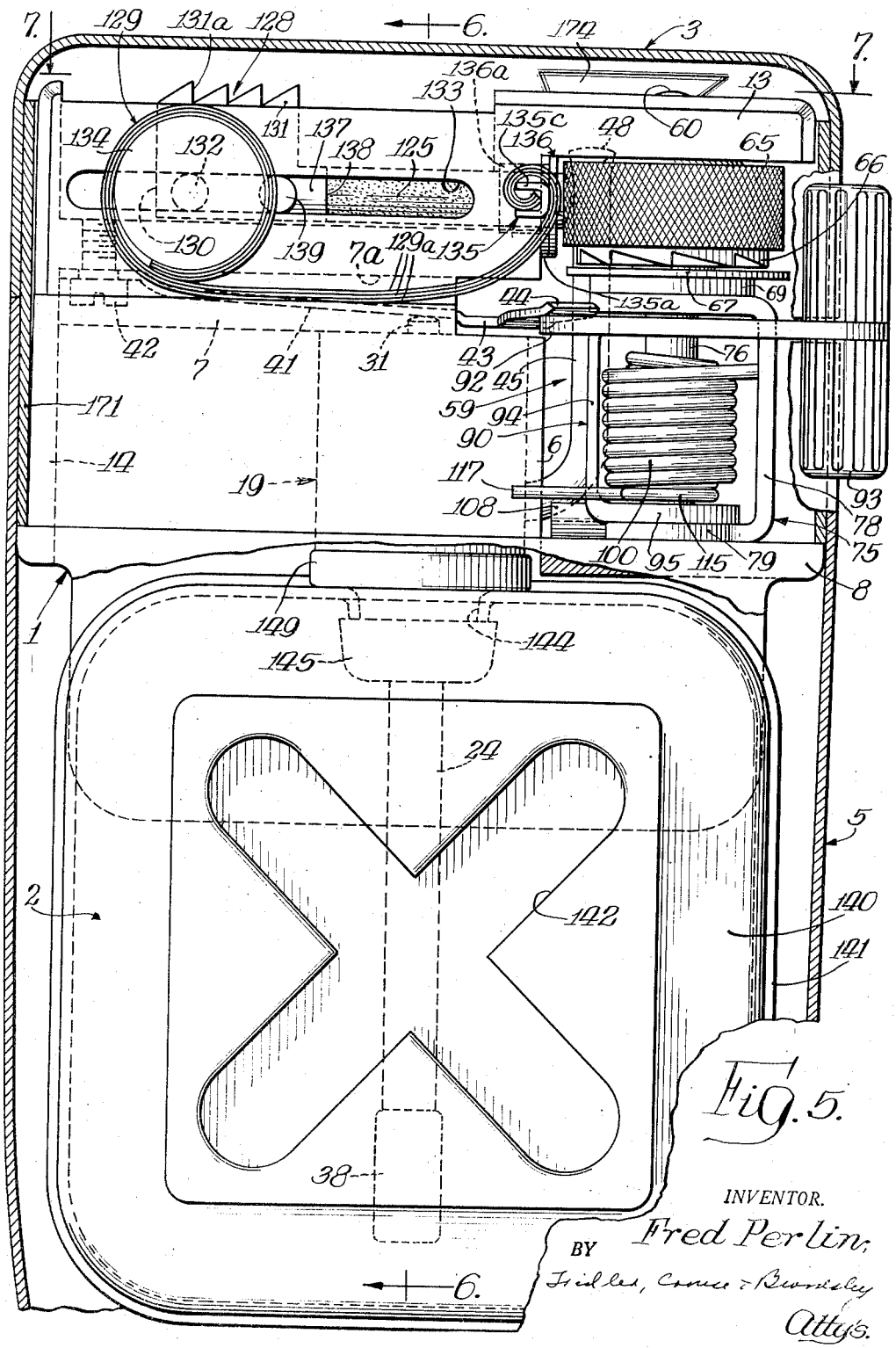
Fig. 5 is an enlarged fragmentary, vertical sectional view, partially in cross section, of the lighter of Fig. 1.

Referring now particularly to Figs. 5 and 6 of the drawings, the lighter of the present invention comprises a chassis 1 adapted to carry the mechanism for controlling the discharge of fuel and for striking a spark, a fuel tank or reservoir 2 adapted to be detachably connected to the chassis 1, and an enclosing casing 3 which preferably includes cooperating casing members 4 and 5.

The chassis 1 is constructed preferably of metal, as are all the other members of the lighter except where expressly stated to be of other materials. The chassis 1 includes a pair of spaced, generally parallel side walls 6, a top wall 7 extending between the side walls 6, a floor 8 extending between the side walls 6 at a portion offset from and below the level of the top wall 7, a flint guide 12 upstanding from the top wall 7 and an arm or bracket 13 projecting from the flint guide 12 and over the floor 8. An end wall 14 preferably joins between the ends of the side wall portions which extend between the floor and the top wall and defines with the adjacent portion of the side walls a chamber 15 open at both its bottom and its end opposite the end wall 14.

A burner and valve assembly 19 for conducting fuel from tank 2, to a point of ignition and for controlling the flow of such fuel, is carried by the chassis 1 and includes a valve body or housing 21 disposed in the chamber 15 and suitably connected to the chassis, as by screws 20 extending through the top wall 7. The valve body 21 (Fig. 8) is formed with a vertical bore 22 and a horizontal bore 23 intersecting the bore 22 and communicating therewith to provide a fuel passage extending through the valve body 21. The bore 22 opens at its lower end into an enlarged bore portion 25 (Fig. 8) adapted to receive a stem or tube 24 which is of such length that it extends into the tank 2 and to a point close to the bottom thereof and serves to define an outlet passage for fuel from the interior of the tank 2. The lower end of the stem 24 has a reduced orifice 26 in its end wall providing communication between the interior of the tank 2 and the interior of the stem 24. A valve seat or shut-off disc 27 formed of a suitable elastomer, as for example neoprene, which is inert to the fuel and which has sufficient resilience for the purpose required is disposed in the lower end of the stem 24 and has an orifice 28 registering with the orifice 26. For convenience in manufacture the stem 24 preferably is made in two parts, the lower end portion being formed as a separate end member or insert 29, which preferably is soldered to the main portion of the stem.

Slidable in the stem 24 is a valve rod 30 (Fig. 6) which is of slightly less diameter than the stem 24 and which is adapted to abut at its lower end against the shut-off disc 27 to thereby close communication between the orifice 28 and the interior of the stem 24. The space 49 between the rod 30 and stem 24 is very narrow and hence has a very small total capacity. This space is only a few thousandths of an inch and preferably not more than about 0.004" in its wall-to-wall dimension. Secured to the upper end of the rod 30 is a head or shank 31 which is disposed in an internally threaded bore 32 (Fig. 8) in vertical alignment with and communicating with the bore 22. A stop nut 33 is threaded into the bore 32 and serves to enclose the stem 31 except for the upper end portion which projects through an opening 34 in the stop nut 33. The shank 31 is formed with a flange 35 of larger diameter than the opening 34 and which serves to limit the upward movement of the stem 31. A sealing member or static ring 36 of suitable resilient sealing material, such as neoprene, which preferably takes the form of an O ring, is disposed between the flange 35 and the upper end wall of the stop nut 33 and sealingly surrounds the stem 31 to prevent the escape of fuel from the interior of the valve body 21. A coil spring 37 is disposed around the stem 31 and seats at its lower end against the bottom of the bore 32 and at its upper end against the flange 35 thereby to yieldingly urge the stem 31 and connected rod 30 in an upward direction. Thus, it will be seen that the rod 30 and the shut-off disc 27 together form a valve (hereinafter sometimes referred to as the "outlet valve") for controlling the passage of fuel from the interior of the tank 2 into the interior of the tube 24. This valve, as thus far described, it will be noted, is normally urged into open position.

The outlet valve is held in closed position by a valve spring 41 of the leaf type (Figs. 5 and 6) secured at one end to the chassis, as by a screw 42, and extending over and resiliently bearing against the upper end of the shank 31, and overcoming the pressure of the spring 37. The free end 43 of the valve closing spring 41 is formed with an upturned end 44 adapted to be engaged by an actuating member hereinafter described which upon suitable actuation lifts the spring 41 and allows the valve rod 30 to be lifted by its spring 37. The valve closing spring 41 preferably is accommodated in a groove 7a formed in the top wall 7 of the chassis 1.

Threaded onto the end of the stem 24 is a stem screw or cap 38 having an orifice 39 in its end wall and adapted to maintain against the end wall of the stem 24 a filter and metering disc 40. The filter and metering disc 40 is formed of a suitable material, as for example glass fiber which is inert to the fuel and which is formed with a large number of minute passages therethrough and which member serves both to filter out from the fuel any solid form matter which may accidentally be present and also to restrict the flow of fuel from the tank into the interior of the tube 24. Disposed between the bottom wall of the tank 2 and the bottom end of the stem 24 is a wick 46 formed of a suitable material such as felt, absorbent cotton or the like, and which is suitably secured, as by an adhesive 46a, to the bottom wall of the tank 2 and extends into contact with the filter disc 40.

Extending from the side of the valve body 21 and communicating with the horizontal passage 23 (Fig. 8) is a flame or burner tube 45 having one end secured in an enlarged bore portion 47 and its other end terminating in a flattened burner tip 48. Thus, it will be seen that a continuous outlet passage leading from the interior of the tank 2 is provided by the stem 24, the passages 22 and 23 in the valve body 21 and the flame tube 45, whereby fuel may be conducted from the tank to a point of ignition.

The lighter of the present invention is adapted to utilize a fuel, as for example butane, which, at normal temperatures at which the lighter is to be used, takes the form of a gas but which may be rather readily liquefied by compression and/or cooling. The fuel is introduced into the tank when the lighter is charged in the form of a liquid and preferably at a temperature below the vaporization temperature, after which the tank is closed. When the tank is at a normal use temperature, the fuel in the tank is under substantial pressure and a portion of the fuel is in gaseous form, the remainder being in liquid form. The valve and burner assembly disclosed herein is adapted to conduct fuel from the tank and deliver it to the flame tube or burner in gaseous form.

The wick 46 is saturated with fuel in liquid form, as is the filter disc 40. When the outlet valve is opened by raising the rod 30, fuel vaporizes at the upper surface of the filter disc 40 and passes into the space 49 and thence into an enlarged chamber 49a defined between the rod 30 and the passage 22 in the valve body 21. The vapor or gas is under the pressure of the fuel in the tank 2 and therefore passes out through the passage 23 and the burner 45.

The filter 40 exerts a combined filtering and flow-restricting effect on the liquid passing through it. The flow-restricting or metering effect may be adjusted by adjusting the position of the cap 38 on the stem 24 to increase or decrease respectively the compression of the filter disc 40 and, consequently, the resistance to flow therethrough.

If the lighter should be in inverted position, the free liquid in the tank 2 will, of course, be displaced toward the end of the tank away from the wick 46. However, the latter, together with the filter disc 40, will retain by capillary action a quantity of liquid which will thereby provide a sufficient supply of fuel to sustain a flame for a suitable period.

Thus it will be seen that the metering disc 40 operates at all times as a "wet" meter, that is to say it always controls the passage of fuel in liquid form regardless whether or not the free body of the liquid in the tank surrounds the stem 24. The wick 46 is provided so that the metering disc will be supplied with fuel in liquid form at all times. The metering disc 40 is adjusted appropriately for passing liquid at such a rate as will maintain the proper rate of flow of gas from the burner tip to provide the desired flame height.

Figure 8:
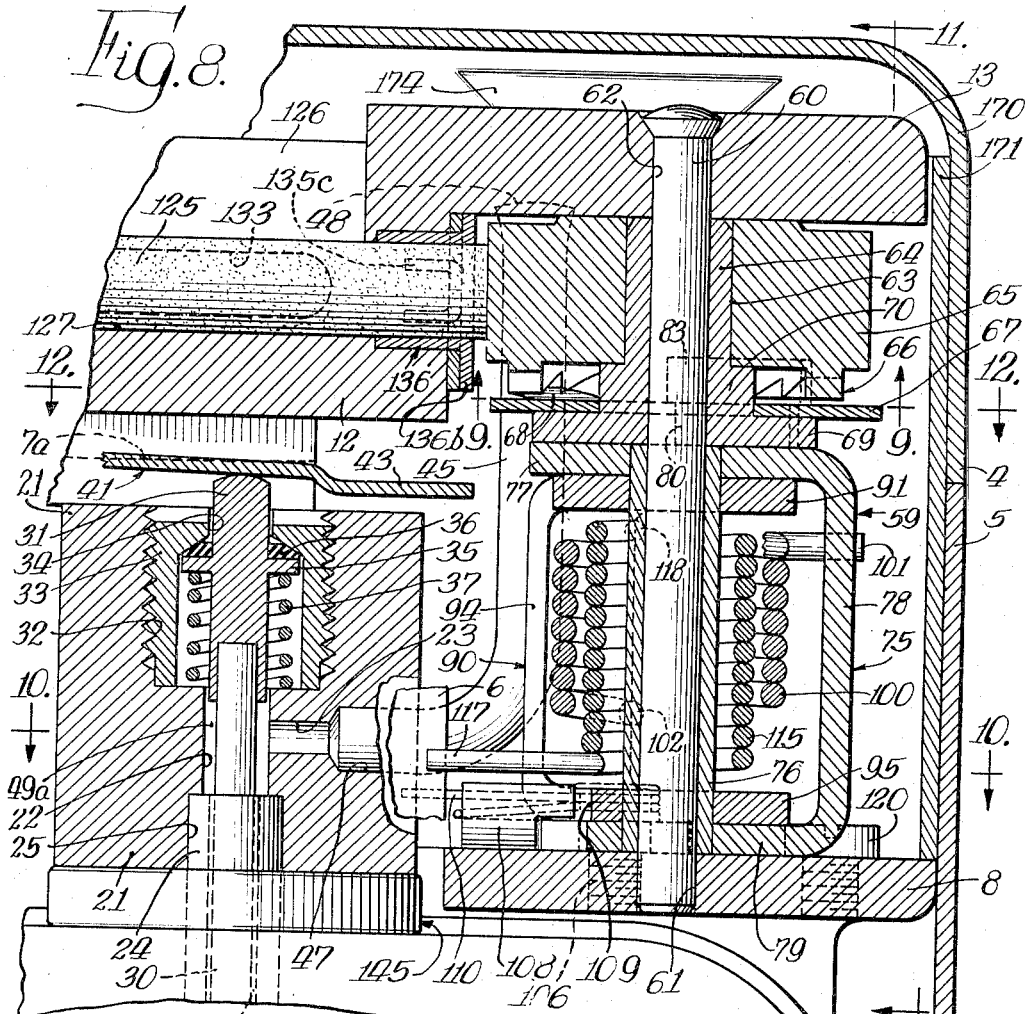
Fig. 8 is an enlarged, fragmentary, vertical sectional view showing particularly the mechanism for actuating the flint wheel and controlling the gas outlet valve.
Figure 9:
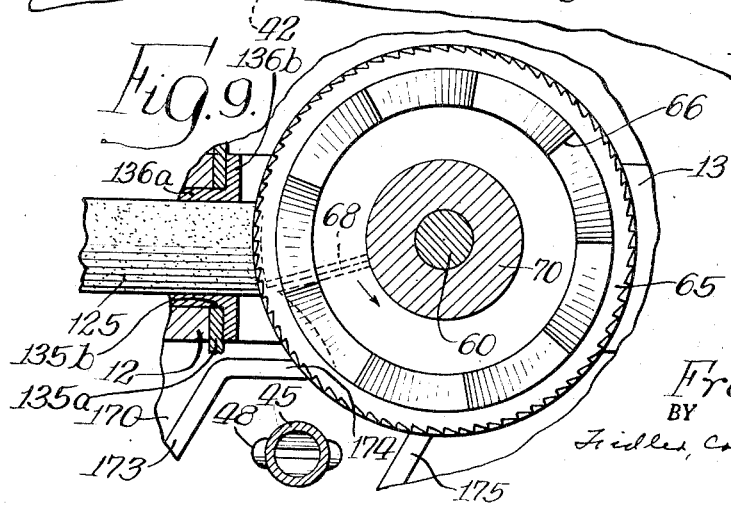
Fig. 9 is a fragmentary, horizontal, sectional view taken along the line 9—9 of Fig. 8.

The lighter is provided with an actuating mechanism 59 (Fig. 5) which upon suitable operation by the user serves both to open the outlet valve and to rotate a flint or sparking wheel cooperating with a flint to strike and throw a spark into gas issuing from the burner tip. The mechanism 59 is disposed substantially within the space between the floor 8 and the bearing arm 13 (Figs. 5, 8 and 11). A shaft 60 (Fig. 8) is secured in aligned openings 61 and 62 in the floor 8 and arm 13 respectively, and serves to support the actuating mechanism 59. Mounted on the shaft is a bushing 63 having a reduced shank 64 on which is rotatably mounted a sparking or flint wheel 65 of cylindrical form and having the usual knurled peripheral surface. On the underside of the sparking wheel is a circumferential series of inclined teeth together forming a ratchet element 66.

Disposed immediately below the ratchet element 66 is a wafer or drive pawl 67 (see also Fig. 12) which takes the general form of a split ring having one end bent upwardly out of the plane of the ring and forming a pawl or dog 68 underlying and adapted to engage with the teeth respectively of the ratchet element 66. The drive pawl 67 is supported on an enlarged head 69 of the bushing 63 and is centered relatively to the shaft 60, and therefore in register with the teeth of the ratchet element 66, by a portion 70 of the bushing 63 intermediate in diameter between the shank 64 and the head 69.

The pawl and ratchet arrangement just described provides a one way drive for the sparking wheel 65 whereby upon rotation of the drive pawl 67 in one direction, the sparking wheel 65 is rotated similarly but the drive pawl 67 may be rotated in the opposite direction without causing any movement of the sparking wheel 65. The drag of the flint on the wheel 65 prevents reverse rotation.

The drive pawl 67 is adapted to be pivotally moved about its axis by a drive bracket 75 (Fig. 8) pivotally supported on the main shaft 60 by a shaft bushing 76 which at its lower end rests on the floor 8 and at its upper end abuts the bushing 63. The drive bracket 75 is generally U-shape in form with an upper arm portion 77 of generally circular form, a vertical strap portion 78 and a lower arm portion 79 of generally circular form. The upper arm portion 77 is provided with an upstanding lug 80 received in a notch 81 (Fig. 12) formed in a portion 82 of the drive pawl 67 projecting outwardly beyond the periphery of the sparking wheel 65, the lug 80 being preferably formed with an enlarged upper end portion 83 which serves to prevent disengagement between the lug and the drive pawl.

Pivotally mounted on the shaft 60 by the shaft bushing 76 is a valve operating bracket 90 which serves both as means for raising the spring 41 to open the outlet valve and also as means for energizing the spring which moves the drive bracket 75. The valve operating bracket 90 includes an upper arm 91 having a projection 92 positioned to bear against the under surface of the spring end 43 and operative upon pivotal movement of the valve operating bracket to raise the spring 41 sufficiently to allow the outlet valve to be opened by its spring 37. At a point on the upper arm 91 approximately 90 degrees from the projection 92, an operating handle 93 is secured for the purpose of conveniently permitting the operator to effect pivotal movement of the valve operating bracket 90.

The valve operating bracket 90 includes also a vertical strap portion 94 and a lower arm 95 mounted on the main shaft bushing 76.

The valve operating bracket 90 is connected by a driving spring 100 (Figs. 8 and 12) to the drive bracket 75 whereby upon rotation of the former, the spring 100 is tensioned while the drive bracket 75 is restrained against movement until the valve operating bracket 90 reaches a predetermined position, at which time the drive bracket 75 is released, thus allowing the spring 100 to rapidly move the drive bracket 75 through a pivotal movement. The spring 100 is disposed substantially concentrically about the shaft 60 and has one end 101 bearing against the strap 78 of the drive bracket 75 and the other end 102 (Figs. 8 and 11) bearing against the valve operating bracket 90. Thus, as the valve operating bracket is pivotally moved relatively to the drive bracket 75, the spring 100 is "wound" or tensioned.

For the purpose of restraining the drive bracket 75 while the spring 100 is being energized by pivotal movement of the valve operating bracket 90, a holding pawl 105 (Figs. 10 and 13) is pivotally supported on the floor 8 as by a screw 106 and is positioned to engage a notch 107 in the arm 79. The pawl 105 has an upturned end 108 (Fig. 8) which projects into the path of a cam surface 109 on the lower arm 95 of the valve operating bracket 90. The pawl 105 is urged into position to engage the notch 107 by a spring 110 (Fig. 10) having one end bearing against a side wall 6 of the chassis and the other end bearing against the upturned end 108 of the pawl 105.

Upon pivotal movement of the valve operating bracket 90 out of its rest position by manual manipulation on the part of the user, the drive spring 100 is tensioned, and, as the valve operating bracket is moved further, the cam surface 109 moves the holding pawl 105 out of engagement with the notch 107 whereupon the drive spring 100 rapidly moves the drive bracket pivotally out of its rest position and through an angle of approximately 90 degrees. This pivotal movement of the drive bracket effects similar pivotal movement of the drive pawl 67 and thereby pivotal movement of the sparking wheel 65. The limit position of the drive bracket 75 in a forward direction is established by the drive bracket 75 engaging the upper arm 91 of the valve operating bracket 90.

Upon release of the handle 93 by the user, the valve operating bracket 90 and the drive bracket 75 are returned to their initial positions by a return spring 115 (Fig. 8). The return spring 115 is disposed about the shaft 60 and has one end 117 (Fig. 10) bearing against a side wall 6 of the chassis and the other end 118 (Fig. 11) bearing against the strap portion 94 of the valve operating bracket 90. When the user releases the valve operating bracket 90, the return spring 115 pivotally moves the valve operating bracket 90 back to its initial position and the upper arm 91 bears against the strap portion 78 of the drive bracket 75 and causes corresponding movement of the latter to its initial position. The initial position of the drive bracket 75, and consequently the initial position of the valve operating bracket 90, is established by a stop which may take the form of a screw 120, positioned in the path of the lower portion 79 of the drive bracket 75, or by an elongated washer (not shown) secured to the floor 8 by the screw 120.

A flint 125 (Figs. 5, 6 and 8) is provided and is guided and resiliently urged into engagement with the knurled periphery of the sparking wheel 65. The flint 125 is positioned in an open top groove 126 (Fig. 6) formed in the flint guide 12 and preferably provided with an arcuate bottom surface 127.

The flint 125 is resiliently urged into contact with the sparking wheel 65 by a spring and follower mechanism which includes a follower 128 (Fig. 6) and a pair of springs 129 for driving the follower. Each spring 129 is formed by a plurality of leaves 129a, preferably three in number. The leaves are not interconnected in any way. The leaves 129a however, are stacked and are similarly pre-stressed in coiled form. Thus, each spring may be readily coiled in a small diameter coil, but by reason of the plurality of leaves has a substantial strength.

The follower 128 has a body portion 130 disposed in the groove 126 and an upper flange portion 131 which rides on the top edges of the flint guide and is formed in its upper surface with serrations 131a which permit the follower to be retracted by the finger of the user. The follower 128 is carried on a shaft 132 which extends through slots 133 in the side walls of the flint guide and which carries at its end portions, respectively, spring drums 134. Each spring 129 is wound at one end about the corresponding drum 134 and is anchored at the other end by an anchor 135 mounted in the flint guide adjacent the inner end of the flint guide by a flint tube 136 and consequently close to the periphery of the sparking wheel 65. The anchor 135 includes a flat body portion 135a having an aperture 135b and U-shaped arms 135c extending therefrom. The body portion 135a is disposed against the end wall of the flint guide 12, with the aperture alined with the groove 126 and the arms extending laterally. The flint tube 136 has a tubular body 136a which extends through the aperture 135b and press-fitted into the flint guide 12 and a flange 136b which serves to retain the anchor 135. The springs 129 being pre-stressed in coiled form they tend to remain so and thus urge the follower 128 toward the sparking wheel 65 with the result that when a flint is disposed in the groove 126, the flint is resiliently urged against the sparking wheel. The springs 129 are not anchored to the drums 134 and hence the force they exert on the follower 128 tending to urge the flint 125 into engagement with the sparking wheel is substantially constant throughout the entire movement of the flint. Thus as the flint is worn down in the course of the use of the lighter, the force exerted on the flint by the springs and follower remains substantially constant throughout the life of the flint.

The follower 128 preferably is provided with a flint engaging portion 137 which is serrated or knurled on its forward flint engaging surface 138 for better engagement with the flint and to prevent the flint from turning. The follower 128 also is provided with a pin 139 which rides in the slots 133 and thus prevents tilting or rocking of the follower 128 when it is retracted manually.

The flint 125 may be readily removed and replaced by retracting the follower 128 and inverting the lighter thereby permitting the flint to drop out of the open top of the flint guide groove 126 whereupon a replacement flint may be readily inserted, the follower being held in retracted position during such operation.

The tank 2 may take various forms, but I prefer to employ a tank of the construction illustrated. The tank is formed with a generally cup-shape member 140 which for convenience has a generally square overall shape and square cross-section although the shape may be varied as will be understood. A cover 141 is permanently and sealingly secured to the body member 140 in a suitable manner as by welding or brazing.

Both the tank body 140 and the tank cover 141 preferably are made more rigid in their side walls by forming the latter with corrugations or indentations 142 and 143 respectively.

The tank 2 is adapted to be filled by a suitable filling mechanism (not shown) and the fuel preferably is introduced into the tank at a sufficiently low temperature so that the fuel is in liquid form.

The tank 2 (Figs. 6 and 14) is formed with a filling and discharge opening 144 which is adapted to receive a plug 145 formed of a suitable elastomer which is inert to the fuel and which has sufficient resilience to provide the necessary sealing action at the opening and around the stem 24 which extends into the tank 2. A lip 146 is turned around the opening 144 and the plug 145 has a shank 147 which extends through the opening and a head 148 which engages the inner edge of the lip 146. The plug 145 also is provided with a flange 149 adapted to engage the outer wall of the tank adjacent the opening and thereby in cooperation with the head 148 retain the plug in place. Extending longitudinally through the plug and concentrically thereof is an opening or bore 150 adapted to receive the stem 24 which depends from the valve body.

The opening 150 is closed by a plug core 160 (Fig. 15) formed of suitably rigid material, such as aluminum. The core includes a body 161 having a reduced end 162 and an enlarged end 163. Extending from the body 161 is a shank 164 joined to the body 161 by a reduced frangible section 165, and a tapered free end 166. After the tank has been filled, the sealing assembly consisting of the plug 145 and the plug core 160 is inserted in the opening 144, the plug being of such material and the dimensions of the members being such as to permit the assembly to be inserted readily. The core body 160 is then pulled into the opening 150 to thereby firmly clamp the plug between the core and the tank body whereafter the shank or stem 164 is broken off leaving only the core in the plug.

When it is desired to assemble the tank with the chassis, it is positioned with the core in alignment with the lower end of the stem 24 and the latter pushed into the plug to thereby enter the tank and at the same time push the core 160 out of the plug so as to permit entry of the stem and provide communication between the tank and the interior of the stem.

The casing 3 (Figs. 1 and 6) includes the hollow top member 4 formed by a generally cupped member having a generally rectangular transverse shape with a cap member portion 170 and a skirt portion 171 integral therewith. If desired the cap portion 170 and skirt portion 171 may be separately formed and then integrally joined. The cap portion 170 is formed with an opening (Figs. 4 and 11) through which the gas is adapted to be discharged. The opening 172 is recessed by forming down the material from the top wall of the cap member 170 so as to provide upwardly divergent side walls 173, 174 and 175 around three sides of the opening, the fourth side being open down to the level of the lower portion of the opening.

The opening 172 is positioned directly above the burner tip 48 of the flame tube 45 with the outer edge of the opening at approximately the level of the end of the tube.

An air opening 176 (Figs. 3 and 11) for admitting primary air into the interior of the casing is formed in the side wall of the member 4 below the flame opening 172. The air opening 176 extends through a sufficient length to permit air to be drawn into the top member 4 around the flame tube in sufficient quantity to support combustion.

At least one of the casing members, and preferably the lower member 5, is notched or otherwise suitably shaped as at 177 to permit the upper arm 91 of the valve operating bracket 90 to project therefrom so that the handle 93 may be located exteriorly of the casing.

The lower casing member 5 is formed as a comparatively deep cup of generally rectangular form and generally rectangular cross-sectional shape. It is adapted to receive the lower portion of the chassis 1 and the skirt portion 171 and to frictionally engage the faces of the latter to retain the casing members 4 and 5 relatively to each other. The upper casing member 4 may also have frictional engagement with the side faces of the chassis 1. For the purpose of increasing such frictional engagement, the skirt may be formed with a plurality of ribs 178 which project inwardly and engage the side faces of the chassis.

The casing members 4 and 5 may be made of any suitable material and may be either plastic or metal; metal such as brass has been found to lend itself readily to forming the casing members.

The chassis may be provided with means for aiding in retaining the fuel tank in position and a structure embodying such means is illustrated in Figs. 19–21, inclusive, to which reference now is made. In this embodiment of the invention, the chassis 180 is provided with a plurality of clip members or tongues 181 secured thereto as by rivets 182 and formed with projections or "buttons" 183 adapted respectively to enter the upper ends of the corrugations 142 and 143 in the tank. The side walls of the chassis 180 are recessed as at 184 to receive the upper ends of the clips 181, and are provided with slots 185 therebelow to permit the lower, free ends of the clip 181 to be bent outwardly to allow the tank 2 to be moved into its position relative to the chassis 180. The clips 181 are formed of suitable spring material in order to permit them to be bent outwardly to receive the tank and at the same time engage the tank when the latter is in position and prevent withdrawal thereof.

The outlet valve may be modified in various ways and means may be provided in connection with each such form of outlet valve to limit the extent to which the valve is open and thereby control the outflow of gas through the flame tube. Such limiting means may be made adjustable in order to permit the ready adjustment of the flame height. Referring to Fig. 22 of the drawings, there is illustrated a modified form of valve together with adjustable stop means for adjustably limiting the extent of opening the outlet valve.

The valve body 190 is formed in a manner generally similar to the valve body 21 (Fig. 8) previously described, and has an internally threaded bore 191 receiving a stop nut 192 in which is slidable a valve rod 193, having a flange or head 194. A sleeve-like member 195 formed of a suitable elastomer is disposed within the stop nut 192 forwardly of the head 194 and serves both as a resilient means to urge the valve stem upwardly and a seal around the valve rod.

A tube or stem 196, which preferably is relatively short, is inserted in the valve body 190 and provides communication between the interior of the tank 2 and a passage 197 in the valve body communicating with a passage 198 which connects with the flame tube 199. The upper end of the stem 196 is provided with an enlarged bore 200 in which is disposed a disc 201 of suitable sealing material having an orifice 215 against which disc the valve rod 193 is adapted to seat and close the orifice 215. The rod 193 and disc 201 thus constitute the outlet valve. A restricted opening 202 extends from the bore 200 and opens into the principal bore 216 of the stem 196.

The valve rod 193 is normally urged upwardly by the member 195 to permit gas to pass through the orifice 215 and out through the passages 197 and 198 and the flame tube 199. However, as in the case of the valve arrangement previously described, a valve spring 203 is provided which overcomes the pressure of the spring 195 and normally urges the valve rod 193 into closed position and which is raised, to permit the valve to open, by suitable valve actuating mechanism, which may be similar to that shown in Fig. 5 and described hereinabove.

Disposed in and substantially filling the tank 2 is a solid absorbent 217 such as absorbent cotton which retains the fuel in liquid form. A filter 205 formed of suitable filtering material such as rolled filter paper is disposed in the upper end of the stem 196 for the purpose of filtering out any solid foreign matter in the fuel passing from the tank. The space 218 in the tube between the lower end of the filter 205 and the lower end of the tube provides a vaporizing space in which fuel vaporizes and from which the fuel in gaseous form passes through the filter 205, the bore 202 and the orifice 215.

When the outlet valve is opened, gaseous fuel passes through the bore 200, the passages 197 and 198 and the burner tube 199.

In order to adjustably limit the extent of opening of the outlet valve, a stop member 210 is provided which takes the form of a screw threaded into the flint guide portion 211 of the chassis, a suitable threaded opening 212 and recess 213 being provided to receive the stop screw 210. Access to the stop screw 210 may be had through the upper open portion of the flint guide groove 214 after the flint has been removed or sufficiently retracted to permit such access.

It will be seen, therefore, that the extent of opening of the valve rod 193, and consequently the height of the flame may be adjusted by the user by suitably adjusting the stop screw 210.

It is usually desirable to be able to replace the sparking or flint wheel 65, when the latter has become worn or dulled, after a long period of use. To this end, the present invention provides in an embodiment thereof an arrangement for mounting the sparking or flint wheel 65 whereby the latter may be readily replaced by the user. Referring to Fig. 23, the chassis 218 is formed generally similar to the chassis shown in Fig. 5 for example and previously described, except that the bracket 215 which projects from the flint guide is disposed at a lower level than the bracket 13 of the previously described form. The sparking or flint wheel 65 is disposed above instead of below the bracket 215. The flint wheel 65 is rotatable on a shaft 216 which is threaded at its lower end into the floor 217 of the chassis 218 and extends through an opening 219 in the bracket 215 which latter aids in supporting the shaft 216. The sparking or flint wheel 65 is retained on the shaft 216 in a suitable manner as by a C washer 220 engaging a narrowed shank 222 of the shaft 216; a spacing washer 221 preferably is provided between the wheel 65 and the washer 220. The sparking or flint wheel 65 is supported on the shaft by a bushing 223 supported in turn by the upper arm 224 of a drive bracket 225 pivoted on a shaft 216 and having its lower arm 226 bearing on the floor 217. The bushing 223 has a flange 227 which carries a wafer or drive pawl 228 adapted to engage with the teeth of the ratchet element 66 of the sparking wheel 65. The remainder of the actuating means for the sparking wheel 65 is generally similar to that shown in Fig. 5 and described in connection therewith.

The operation of this form of invention is similar to that described in connection with the form shown in Fig. 5. However, the sparking or flint wheel 65 may be very readily removed by merely removing the C washer 220 and the spacing washer 221 after which the sparking wheel 65 may be slipped off the upper end of the shaft 216 to permit which the diameter of the head 229 of the shaft 216 is no larger than the diameter of the bore through the sparking wheel 65. Thus the shaft 216 and the remaining parts which it supports need not be removed when removing the sparking wheel 65.

The lighter of the present invention may employ a tank which is more or less permanently fixed relatively to the chassis and which when the fuel is exhausted is recharged in situ without the necessity of removing the tank. The tank is provided with suitable valving means to permit recharging of the tank in situ without loss of fuel and hence may be recharged whether it is completely empty or partially empty. One embodiment of the lighter having a relatively fixed tank and a filling or transfer valve for permitting the filling of tank in situ is illustrated in Figs. 24 and 25, to which reference now is made.

The lighter, a portion of which is shown in Figs. 24 and 25, may be generally similar to the lighter shown in Fig. 5 and described in connection therewith except as to the portions shown in Figs. 24 and 25 and specifically described hereinafter.

In this form of lighter the chassis 250 carries a valve block 251 generally similar to the valve block 21 except that it is provided with a threaded socket 252 into which is threaded a stem 253 which extends into and through the tank 254 and has a flange 255 at its lower end. The stem 253 thus has as one of its functions the retention of the tank 254 in position relative to the valve block 251 and, consequently, the chassis 250. A sealing washer or grommet 249 is disposed around the upper portion of the stem 253 between the tank 254 and the valve block 251 for sealing purposes. While the stem 253 may be removed for the purpose of removing the tank 254 in case this should be necessary, under ordinary circumstances neither the tank nor stem is removed from the block 251.

The stem 253 is provided with an axial bore 256 and one or more transverse bores 257 communicating therewith and opening into the interior of the tank 254. The bore 256 communicates with a bore 258 in a stem 259 depending from the valve block 251 and sealed in the stem 253 by an O ring 262. The bore 258 communicates suitably with a burner tube 260. The bore 256 is adapted to be closed by an outlet valve arrangement (not shown) of suitable construction and which may be generally similar to the valve arrangement shown in Fig. 22. The outlet valve is suitably adjustable, as, for example, in a manner similar to that shown in Fig. 22. The valve (not shown) has a valve stem 263 normally urged upwardly but held down by a spring 264 generally similar to the spring 41 hereinbefore described.

Disposed in and substantially filling the tank 254 is a solid absorbent 267, such as absorbent cotton, which retains the fuel in liquid form.

A transfer valve is provided and is conveniently located in the lower end of the stem 253 for permitting the introduction of fuel into the tank 254. The stem 253 is formed with an enlarged bore 270 opening into a further enlarged bore 271 which opens to atmosphere through the end of the stem 253. One or more transverse passages 272 provide communication between the bore 270 and the interior of the tank 254 except when closed off as hereinafter described. Communication between the atmosphere and the interior of the tank normally is closed by a valve member 273 slidable in the bore 270 and normally seated against a sealing ring 274 of suitable material carried in a nut 275 threaded into the bore 271. The valve member 273 is slidable on a pin 276 having a head 277 seated against the rear wall of the bore 270 and is urged into closed position by a resilient element 278 which preferably takes the form of a sleeve formed of a suitable elastomer. For convenience in manufacturing, the element 278 is made in two sections which may be similar in form and where thus formed, a metal washer 278a is provided to keep the two sections from overflowing one another.

The valve member 273 is adapted to be displaced inwardly beyond the transverse passages 272 by a transfer tip 280, connected to a suitable source (not shown) of fuel, which tip is screwed in the nut 275 when fuel is to be introduced into the tank 254. The transfer tip is formed with a reduced end 285 adapted to enter the ring 274 in sealing relation therewith and has a bore 281 extending to the end, which latter is closed by a puncturable end wall 282 of suitable material such as soft metal. The transfer tip 280 has its shank threaded as at 283 to permit it to be screwed into the internal threads 284 formed in the nut 275.

The pin 276 has its outer end 286 formed in a suitable manner, as by recessing the end, to permit it to readily puncture the end wall 282 when the transfer tip is screwed into the nut 275 and thus the pin 276 serves also as a piercing member. The pin 276 also is formed with a groove 287 which, when the pin 276 enters the transfer tip 280, serves to ensure the egress of fuel from the latter. Likewise, the end of the valve member 273 preferably is recessed, as at 288, to permit fuel to pass from the slot 287 into the interior of the bore 270 inwardly of the sealing ring 274. Since the valve is displaced rearwardly by the transfer tip 280 (as shown in Fig. 25) the bore 281 is placed in communication with the forward end of the bore 270 and the latter provides communication with the transverse passages 272. Thus, fuel may pass from the bore 281 in the transfer tip into the interior of the tank 254.

Both the stem 253 and the nut 275 preferably are provided with slots 290 and 291 respectively for the purpose of permitting them to be screwed into their respective seats and the internal threads 284 of the nut 275 preferably are reversed from the external threads 292 to permit conveniently screwing in of the nut 275 without loosening the stem 252.

When it is desired to charge or recharge the tank 254 or to add fuel thereto, it is merely necessary to screw the transfer tip 280 (which of course is connected to a suitable source of fuel) into the socket provided in the nut 275. This action serves first to effect a sealing action between the end of the transfer tip and the sealing ring 274 whereafter the pin 276 pierces the end of the transfer tip 280, and the valve member 273 is thereafter forced open to permit fuel to flow through the transfer tip and into the tank 254. When the valve member 273 is urged inwardly it further compresses the element 278 which seals off the rearward end of the bore 270. When the transfer of fuel has been effected, the transfer tip is unscrewed from its position in the stem 253 during which operation the valve 273 is closed to again close the tank 254.

Fuel in gaseous form issues from the tank 254 through the passages 257 and 256 and enters the bores 256 and 258. When the lighter is operated to raise the valve spring 264, the gas forces the outlet valve (not shown) open and passes out through the burner tube 260 where it is ignited by the sparking mechanism in a manner similar to that hereinbefore described in connection with the previously described embodiment of the invention.

It will be understood that the transfer valve shown in Figs. 24 and 25 and described in connection therewith may be secured in a wall of the casing in any suitable manner in lieu of being disposed in the stem, and the tank may be secured to the valve body in a manner other than that shown in the drawings.

The present invention includes provision for automatically compensating, at least to some extent, for changes in temperature of the fuel in the fuel tank so that the height of the flame does not vary too widely whether the lighter is operated in cold weather or warm weather. In each of the valves disclosed hereinbefore the valve disc or valving member is formed from a material such as a plastic having a relatively high coefficient of thermal expansion; as indicated hereinbefore I have obtained excellent results when the member is formed from neoprene. When the air surrounding the lighter is relatively warm the fuel in the lighter will develop a higher vapor pressure than when the temperature of the air is lower and when this occurs, of course the flame height will be higher than at lower temperatures. However, the increase in temperature of the surrounding atmosphere, and accordingly the increase in temperature of the lighter parts, will cause the valve member to increase in size with the result that the outlet passage through which the fuel passes from the tank to the burner, when the valve is open, is smaller than when the lighter is used in colder air. This decrease in the size of the outlet passage tends to restrict the flow of fuel and offset, at least to some extent, the increase in pressure of the fuel which results from the operation of the lighter in higher temperature. When the temperature decreases the valve member tends to decrease in size and permits a freer flow of fuel to the burner, thus compensating, at least to some extent, for the decrease in pressure of the fuel in the tank which results from the lower temperature.

I claim:

1. In a lighter, a fuel tank for liquefied gaseous fuel, a burner, conduit means connecting said tank to said burner for the passage of gaseous fuel from said tank to said burner, a valve seat member formed of a resilient material having a relatively high coefficient of thermal expansion disposed in said conduit, means confining said valve seat member for controlling its direction of expansion and contraction, a valve member slidable in said conduit in the direction of expansion and contraction of the valve seat member between a closed position in firm abutment with said valve seat member and closing communication through said conduit and an open position spaced from said valve seat member and permitting the passage of gaseous fuel past said valve seat member, means normally urging said valve member into closed position, and manually actuated means for opening said valve.

2. In a lighter, a fuel tank comprising a tank closed except for an outlet opening in a wall of the tank, a bushing of resilient material disposed in said outlet opening with enlarged portions engaging the opposite sides of said wall, and having a bore therethrough and a removable plug closing said bore, said plug including a body substantially equal in length to said bore, a head on one end of said body adapted to abut said bushing and of sufficient size to prevent it from passing through said bore, but sufficiently small to pass through the outlet opening, and an extension of reduced diameter on the other end of said body joined thereto by a section of further reduced diameter whereby said extension may be broken off from said body.

3. In a lighter, a rigid and unitary chassis having spaced side walls, a top wall connected between said side walls, a flint guide upstanding from said top wall, a floor connected between said side walls at portions thereof offset from and below the level of said top wall, said side walls extending an appreciable distance below said floor, and a bracket projecting from said flint guide and overhanging said floor, a fuel tank removably mounted on the chassis and disposed at least partially between and engaged by said side walls and extending a substantial distance therebelow, a valve housing disposed between said side walls, conduit means connecting said valve housing to the interior of said fuel tank, a burner connected to said valve housing, and manually actuated means for controlling said valve mounted in and disposed between said floor and said bracket.

4. In a lighter, a fuel tank, a burner connected to said fuel tank, means for controlling the flow of fuel from said tank, means for igniting fuel issuing from said burner, and a casing including an integral part inclosing at least said burner and having a flame opening adjacent one side and disposed above said burner and including as an integral portion of said part a generally funnel shape wall structure including upwardly divergent walls surrounding said flame opening throughout a major portion of the periphery thereof and having an open side at the said side of the casing extending downwardly to substantially the level of the flame opening.

5. A lighter comprising a chassis, a fuel tank of substantial depth carried by said chassis for containing liquefied gaseous fuel under pressure, conduit means leading outwardly from adjacent the bottom of said tank for conducting fuel therefrom, means for igniting fuel issuing from said tank, and a shut-off valve in said conduit means adjacent the lower end thereof for controlling the passage of fuel from said tank, said conduit including a first portion outwardly of said valve of a cross-sectional dimension capable of retaining liquid therein by capillary action and a second portion outwardly of said first portion of substantially greater cross-sectional dimension than the first portion and sufficient to permit the fuel to vaporize therein at atmospheric temperatures.

6. A lighter comprising a chassis, a fuel tank of substantial depth carried by said chassis for containing liquefied gaseous fuel under pressure, conduit means having an entrance in and adjacent the bottom of said tank for conducting fuel outwardly from said tank, means for igniting fuel issuing from said tank, a shut-off valve in said conduit means adjacent the lower end thereof for controlling the passage of fuel from said tank, said conduit including a first portion outwardly of said valve of a cross-sectional dimension capable of retaining liquid therein by capillary action and a second portion outwardly of said first portion of substantially greater cross-sectional dimension than the first portion and sufficient to permit the fuel to vaporize therein at atmospheric temperatures, and a wick of substantial fuel-holding capacity in said tank adjacent the bottom thereof and in fueling relation to the entrance of said conduit means for maintaining liquid at said entrance.

7. In a lighter, a chassis, means on said chassis defining an outlet conduit and including a hollow stem projecting from said chassis, and a tank adapted to be detachably connected to said chassis and having an outlet opening for receiving said stem, said outlet opening having a removable tubular resilient sealing member with a bore of substantial diameter and retained in the opening by enlarged end portions on opposite sides of the wall in which the opening is formed, and a sealing plug in said opening having an enlarged head engaging the inner end of the sealing member and sufficiently small to pass through said outlet opening displaceable into said tank upon the insertion of said stem into said opening.

8. A gaseous lighter comprising a chassis, a fuel tank removably mounted on the chassis, a valve structure mounted on the chassis including a stem extending into the fuel tank and having a conduit leading from the tank through the stem and terminating in a burner tip, a valve in the stem, including a movable rod projecting out of the valve structure adjacent the chassis, spring means urging the valve rod up to open position, second spring means normally urging the valve rod down to closed position and of sufficient strength to overpower the first spring means, sparking mechanism for producing sparks and directing them to the burner tip, and single manual actuating means operative for first lifting the second spring means from bearing engagement with the valve rod and thereafter operating said sparking mechanism in a single motion of the actuating means.

9. A lighter comprising a chassis, a fuel tank mounted on the chassis and depending therefrom, a burner and means for controlling flow of fuel from the tank to the burner, a sparking wheel mounted on the chassis, means for actuating said sparking wheel, a flint holder adjacent the top of the chassis having an open top groove for receiving a flint and guiding it toward the sparkling wheel, a flint follower in the groove with a grip portion projecting upwardly out of the groove, said flint follower having a drum on either side outwardly of the flint holder, a spring connected to each drum and the chassis, each spring including a plurality of stacked leaves anchored at one end to the chassis but otherwise disconnected from each other, the leaves being pre-stressed to coiled shape and surrounding the respective drum.

10. A lighter comprising a chassis, a fuel tank mounted on the chassis, means for conducting fuel and controlling the flow thereof, from the tank to a combustion station, said chassis having vertically spaced horizontal portions at one end, a shaft mounted in said horizontal portions, a sparking wheel mounted on the shaft adjacent the top thereof, a flint holder for guiding a flint to the sparking wheel, a manually actuated driving member and a driven member oscillatably mounted on the shaft below the sparking wheel and each having axially spaced mounting points, springs surrounding the shaft between the upper and lower mounting points of the driving and driven members, one of the springs being connected between the members for biasing the driven member rotationally in one direction, and the other biasing both members in the opposite direction, and unidirectional clutch means interconnecting the driven member and sparking wheel.

References Cited in the file of this patent
UNITED STATES PATENTS

| | | |
|---|---|---|
| 784,469 | Campbell | Mar. 7, 1905 |
| 1,134,314 | Canchester | Apr. 6, 1915 |
| 1,828,887 | Aronson | Oct. 27, 1931 |
| 1,911,936 | Armstrong | May 30, 1933 |
| 2,019,435 | Blair | Oct. 29, 1935 |
| 2,153,432 | Reich | Apr. 4, 1939 |
| 2,482,794 | Peterson | Sept. 27, 1949 |
| 2,551,688 | Metzler et al. | May 8, 1951 |
| 2,603,076 | Fukal | July 15, 1952 |
| 2,608,081 | Morgan et al. | Aug. 26, 1952 |
| 2,618,953 | Florman | Nov. 25, 1952 |
| 2,620,643 | Nissen | Dec. 9, 1952 |
| 2,690,067 | Aronson | Sept. 28, 1954 |
| 2,695,508 | Gruber | Nov. 30, 1954 |
| 2,697,339 | Reich | Dec. 21, 1954 |

FOREIGN PATENTS

| | | |
|---|---|---|
| 246,757 | Switzerland | Jan. 31, 1947 |
| 591,677 | Great Britain | Aug. 26, 1947 |
| 681,777 | Great Britain | Oct. 29, 1952 |
| 787,706 | France | July 8, 1935 |
| 815,729 | France | Apr. 21, 1937 |
| 930,041 | France | July 28, 1947 |
| 940,778 | France | June 7, 1948 |